United States Patent [19]

Lamort

[11] Patent Number: 4,846,971
[45] Date of Patent: Jul. 11, 1989

[54] SIEVES FOR SCRUBBERS AND THEIR METHOD OF MANUFACTURE

[75] Inventor: Pierre Lamort, Vitry en Perthois, France

[73] Assignee: E&M Lamort, France

[21] Appl. No.: 157,180

[22] Filed: Feb. 16, 1988

Related U.S. Application Data

[63] Continuation of Ser. No. 794,648, Nov. 4, 1985, abandoned.

[30] Foreign Application Priority Data

Nov. 12, 1984 [FR] France .................... 84 17189

[51] Int. Cl.$^4$ .................... B01D 29/30; B01D 39/10; D21D 5/16
[52] U.S. Cl. .................... 210/232; 210/415; 210/497.01; 210/498; 209/273; 209/395; 29/515; 29/163.8
[58] Field of Search ............ 210/232, 283, 306, 399, 210/402, 403, 404, 414, 415, 413, 497.01, 498, 499; 209/273, 283, 306, 393, 395, 399; 162/321, 323, 357, 372; 29/121.1, 121.3, 160, 163.5 F, 163.5 CW, 515

[56] References Cited

U.S. PATENT DOCUMENTS

| | | | |
|---|---|---|---|
| 1,527,404 | 2/1925 | Haller et al. | 209/393 |
| 1,988,402 | 1/1935 | Thomas | 210/402 |
| 2,803,172 | 8/1957 | Trotman | 210/402 |
| 3,308,594 | 3/1967 | Ashworth | 29/160 |
| 3,389,451 | 6/1968 | Speca et al. | 29/160 |
| 4,410,424 | 10/1983 | Chupka et al. | 209/273 |

FOREIGN PATENT DOCUMENTS 2812071 10/1978 Fed. Rep. of Germany.
16779 7/1910 United Kingdom.

Primary Examiner—Richard V. Fisher
Assistant Examiner—Linda S. Evans
Attorney, Agent, or Firm—Darby & Darby

[57] ABSTRACT

The invention relates to a sieve for a paper pulp scrubber or similar equipment, and to a method for fabricating such a sieve. The sieve is produced by mechanical interfit of bars with support members, the bars carrying notches, the lips of which engage at least one V-shaped lateral groove formed in each support member, while the support members present, on their face receiving the bars, a first set of notches for positioning the bars. The cross-section of the support members at the level of the first notches has the same configuration and dimensions as the cross-section of the second notches and the cross-section of bars at the level of notches has the same configuration as the cross-section of notches formed in the support members. Assembling is made by bending a bar by an angle of about 20-25° for widening a second notch and inserting a support member therein. The bar is then straightened back, so that the support member will be firmly clamped in the notch.

15 Claims, 3 Drawing Sheets

U.S. Patent    Jul. 11, 1989    Sheet 1 of 3    4,846,971
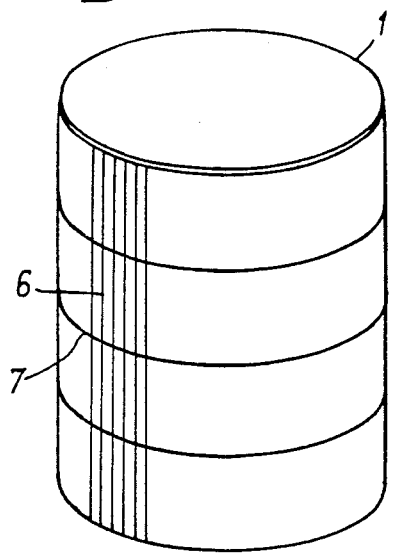
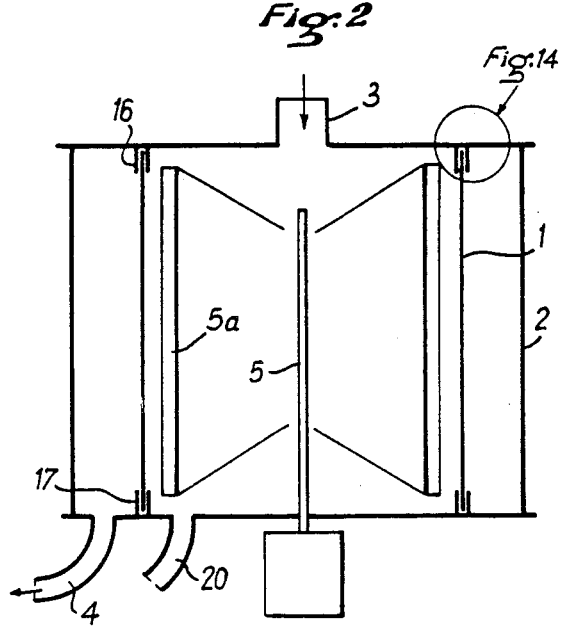
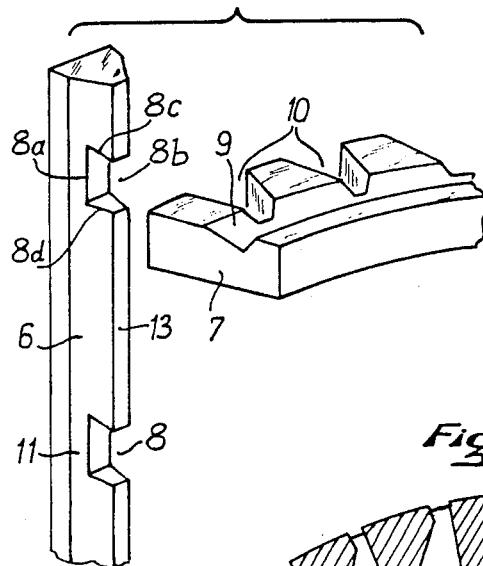
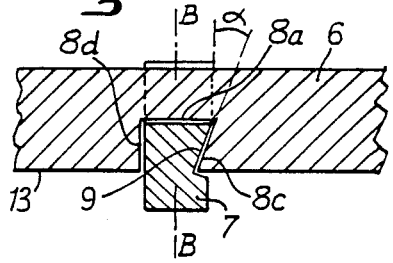
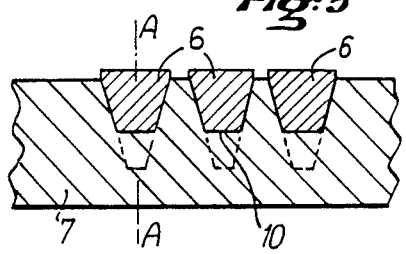
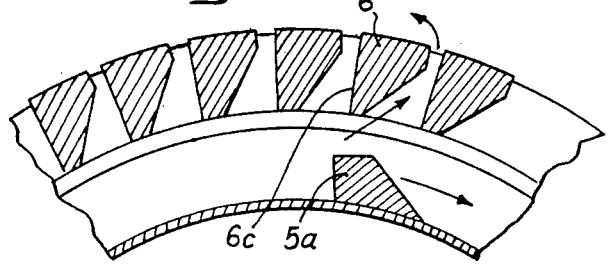

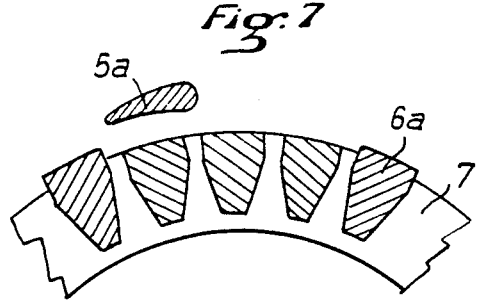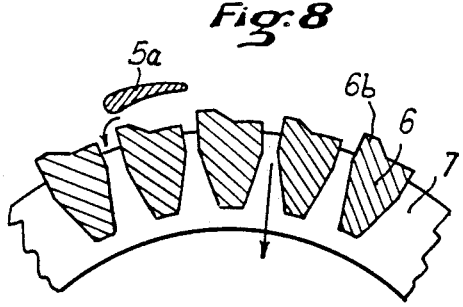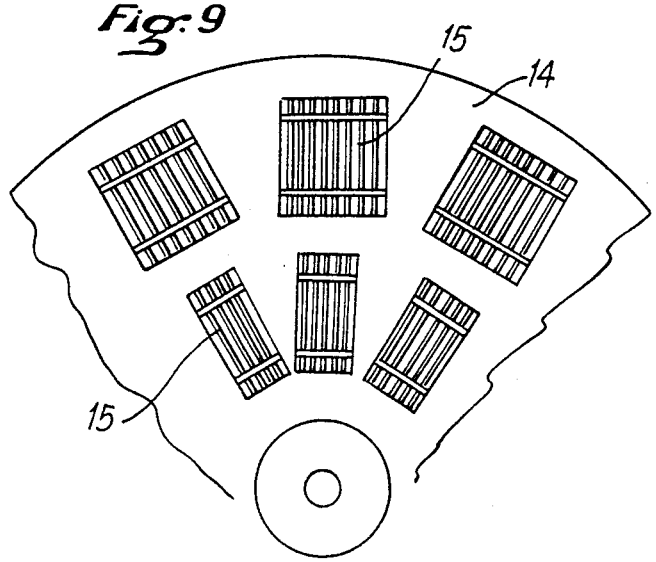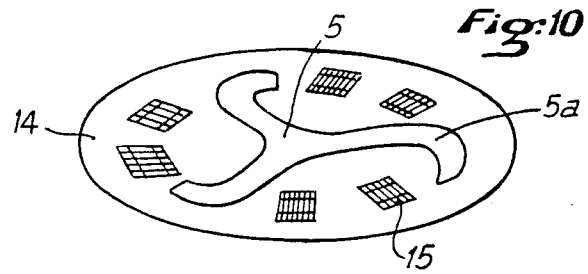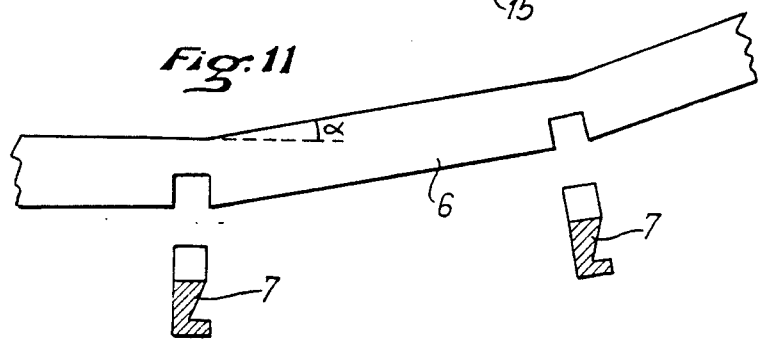

4,846,971

SIEVES FOR SCRUBBERS AND THEIR METHOD OF MANUFACTURE

This is a continuation of application Ser. No. 794,648, filed Nov. 4, 1985, now abondoned.

This invention relates to scrubbers or separators, and more particularly to paper pulp scrubbers of the type comprising one or several slotted sieves.

BACKGROUND OF THE INVENTION

Paper pulp scrubbers generally comprise sieves provided either with slots or holes, these sieves being made of stainless sheet metal such as stainless steel.

Piercing holes through such sheet metal does not raise any manufacturing problems, but matters are different when having to make narrow calibrated slots, the edges of which are usually flared, at least on one face of the metal sheet, according to specified configurations and angles.

Indeed, the width of such slots is in the approximative range from 0.15 mm to 1 mm for sieves, the size of which may range, for cylindrical sieves, from 0.25 m to 1.50 m diameter with 0.30 m to 1.50 m height or length.

In the present practice, these sieves are made either by milling or sawing a sheet of metal, or else by placing side-by-side parallel thin bars forming a grid, these bars being assembled by welding with cross-members in the form of binding hoops which are perpendicular to said bars.

This latter method of manufacture presents major drawbacks, due to the presence of the welds which are fragile because of occurrences of crystallization of the stainless metal which these welds bring about and which have the further drawback of weakening the chemical resistance of the metal.

Moreover, such scrubbers generally include rotors carrying vanes or foils which move close to the surface of the sieve for generating pressure drops and pressure surges for helping in the cleaning out of the sieve and for preventing the slots from becoming plugged by an accumulation of fibers. These rotors run at a high speed, giving rise to very large tangential strains on the bars. These strains tend to tip the bars over when they are arranged along the generating lines of a cylindrical sieve, this being the more frequent case. They also subject the welds to alternating strains which cause these welds to break.

The object of this invention is to overcome these problems.

SUMMARY OF THE INVENTION

Accordingly, the invention provides a slotted sieve being made at least on a portion of its surface by assembling parallel bars to cross-members, characterized in that the bars are assembled to the cross-members without any welds, by means of dovetail shaped notches formed in the bars (the first set of notches), the upper and lower lips of said notches engaging at least one V-shaped groove formed in each cross-member, said cross-members presenting positioning notches (the second set of notches) on their face receiving the bars for positioning said bars, the cross-section of said cross-members at the levels of said positioning notches of the second set having the same configuration and dimensions as the cross-section of said notches of the first set, while the cross-section of the bars at the level of the notches of the first set presents the same configuration as the cross-section of the notches of the second set formed in the cross-members.

Further preferred features of the invention are:

(a) The notches of the first set are dissymmetrical and have one face perpendicular to the axis of the bar, the other face being inclined by an angle preferably comprised in the range from 20° to 25°, approximately.

(b) The end portions of a cross-member present, over a length corresponding to several notches of the second set, a thickness (measured along a parallel to the bars) of approximately half the thickness of the central portion, so as to reconstitute the full cross-section of the cross-member by superimposing said end portions, which are assembled by tightening together the flanks of the notches of the first set formed in the bars overlying said end portions of the cross-members.

(c) The bars and the cross-members have a similar thickness, approximately, and the sum of the depths of the notches of the first and second sets is approximately equal to this thickness.

(d) The bars have a generally trapezoid-shaped cross-section, and the notches of the first set are located on the smaller side of the trapezoid.

(e) There are provided from place to place bars having a greater thickness which form protruding obstacles over the narrow face of the slots formed by the bars being brought close to each other.

(f) The sieve is cylindrical, having either a circular cross-section or a regular polygonal cross-section, the bars are parallel to the axis of the cylinder and the cross-members are perpendicular to this axis.

(g) In a modified embodiment, the sieve is planar and comprises a plurality of elementary sieving surfaces produced in accordance with this invention, each of said surfaces being arranged so that either the bars or the cross-members are placed approximately radially relatively to the center of the sieve.

The invention also encompasses scrubbers equipped with such sieves, as well as a method for manufacturing such a sieve or such an elementary sieving surface, this method consisting in:

folding the bars at the level of the notches of the first set by an angle at least equal to the rake angle of said notches;

placing said bars over the cross-members;

subsequently straightening the bars so as to clamp the cross-members and, in the case where the sieve is cylindrical:

closing the cylinder by superimposing together the end portions of the cross-members, said end portions having half the thickness of the central portion, and then putting the bars in place and clamping the cross-members within the notches of said bars.

The invention will now be further described, referring to the appended drawings, for the purpose of illustrating the characteristics of the invention through different embodiments. In the drawings:

Brief Description of The Drawings

FIG. 1 is a diagrammatic perspective view of a cylindrical sieve having a circular cross-section;

FIG. 2 is an axial cross-section of a scrubber equipped with a sieve in accordance with the invention;

FIG. 3 is a perspective view showing how a bar is assembled with a cross-member;

FIG. 4 is a longitudinal cross-section along line AA of FIG. 5, showing in greater detail how a bar is assembled with a cross-member;

FIG. 5 is a longitudinal cross-section along line BB of FIG. 4 showing a cross-member carrying bars;

FIG. 6 shows a modified embodiment with dissymmetrical slots for a centripetal sieving process;

FIG. 7 is a further embodiment in which the slots are designed for centripetal sieving, with protruding bars from place to place;

FIG. 8 shows a further embodiment with dissymmetrical bars;

FIG. 9 is a plane view of a planar sieve according to the invention;

FIG. 10 is a perspective view of this same planar sieve;

FIG. 11 shows how bars are assembled with cross-members;

DETAILED DESCRIPTION OF THE INVENTION

Figure 12:
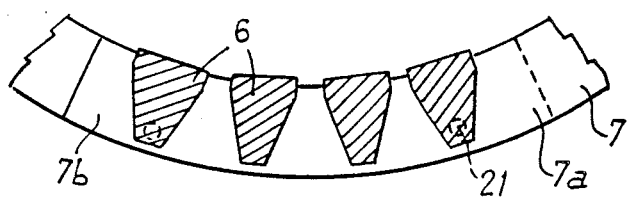
FIG. 12 and 13 illustrate how a cylindrical sieve is closed.

The invention provides a sieve for scrubbers or the like comprising a plurality of support members each having a lateral groove. A plurality of elongated bars have portions which mechanically interfit via a first set of notches with the lateral grooves of the support members to thereby form a sieve. Each support member further has a second set of notches spaced along a periphery thereof which engage with the bars. The notches of the first set have a dovetail configuration with a base wider than an opening and at least one side positioned at an acute angle to the base. The support members are spaced along the bars and the bars define spaces therebetween. The first and second sets of notches position the bars and support members.

Referring now to FIGS. 1 to 5, it will be seen that the sieve 1 is fitted into a scrubber 2 comprising, in the case of a centrifugal scrubber taken here as an example, a pulp inlet 3, a pulp outlet 4, an outlet 20 for oversize material and a rotor carrying vanes or foils 5a. It will further be seen that the sieve 1 is manufactured by a weldless assembling of bars 6 with support members cross-members 7.

The bars 6 present, at the level of the centerline of each cross-member 7, dovetailed notches 8 belonging to a "first set" of notches, the bottom or base 8a of these notches being wider than their opening 8b. The cross-members 7 present at least one lateral V-shaped groove 9 in which will be inserted a lip of the notch 8 such as the upper lip 8c of a notch 8. The cross-members 7 also present notches 10 belonging to a "second set" of notches, inside which will be inserted the portions 11 of the bars 6 which are not nicked by the notches 8. The cross-section of the cross-members in registry with the notches 10 has the same configuration and dimensions as the cross-section of notches 8 over the depth of the latter (see FIG. 4); the cross-section of the bars in registry with the notches 8 has the same configuration as the cross-section of notches 10 over the depth of the latter (see FIG. 5).

As a result of this design, the bars 6 are at the same time very precisely positioned by the notches 10 and firmly assembled through the cooperation of notches 8 with the groove(s) 9. It will thus be possible to produce without any welds a sieve having precisely calibrated slots, capable of supporting the intense mechanical strains generated by the high rotation speed of the rotor 5 carrying vanes 5a.

In the conventional production of slotted sieves, these are often made by milling slots into stainless steel sheets having from 6 to 8 mm thickness, the width of said slots being only a few tenths of a millimeter.

With the manufacturing method according to this invention, it will be possible to use bars or strips 6 having a similar thickness (namely 6–8 mm), assembled by means of cross-members 7 having an approximately similar thickness, so that the weight of metal being used in the manufacturing will be similar. It will however be possible to increase the strength of the sieve by choosing larger dimensions, particularly for the cross-members, while obtaining reduced production costs due to the elimination of the milling operation. On another hand, the above-mentioned drawbacks of a welded assembling are also avoided.

Figure 13:
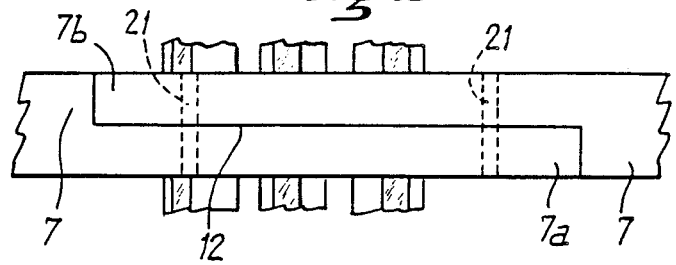

FIGS. 12 and 13 illustrate how the invention also avoids the use of welds for closing together a cylindrical sieve.

Each end portion 7a, 7b of a cross-member 7 is made thinner than the central portion of said cross-member over a lenght corresponding to several bars 6 and along the direction parallel to the bars 6, so that the sum of the thicknesses of portions 7a and 7b will be equal to the thickness of the cross-member 7 and so that the separation face 12 will preferably be approximately median. Putting in place and clamping the bars 6 over the superimposed end portions 7a and 7b will then secure the closure of the sieve.

For avoiding any possible risk of a relative sliding of end portions 7a and 7b, pins 21 are preferably inserted through said end portions, said pins being parallel to the bars 6 and in registry therewith. When the bars 6 are put in place, the pins 21 are held in place by the bars, so that the assembly is completely locked together.

In FIGS. 3 to 5 are represented notches 8 having one face 8d perpendicular to the axis of the bars 6, the other face being inclined with an angle $\alpha$ from 20 to 25°. In this case, the cross-members 7 present only one single V-shaped groove 9 on only one lateral face (this being different from the modified embodiment shown on FIG. 16).

Figure 16:
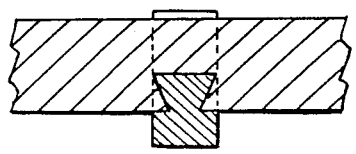
FIG. 16 is a further embodiment of the cross-sectional configuration of the notches of the first set and of the cross-member, in connection with FIG. 4.

This arrangement is preferred because an angle equal to or larger than 90° between the lip 8c and the external face 13 of the bars 6 lends itself readily to the mounting method illustrated by FIG. 11. This method of mounting and assembling consists in folding the bars 6 at the level of the notches 8 by an angle at least equal to the rake angle $\alpha$ of the notches 8 (i.e. the angle between faces 8c and 8d). The notch 8 will then find itself opened and the bar 6 may then be placed over the cross-members 7. Following this, the bar 6 will be straightened until it is rendered rectilinear and it clamps over the cross-members 7. If the angle between faces 8c and 8d and face 13 were an acute angle, as shown by FIG. 16, this procedure of insertion would be more complicated and more difficult to carry out, but it would still always remain possible.

A description will now be given of several modified embodiments which bring about various improvements.

Referring to FIG. 6, the openings of the slots are rendered dissymmetrical by providing bars 6 having a dissymmetrical cross-section. It will thus become possible to achieve an improved sieving operation, resulting from a bouncing effect of the purified liquid impinging against the radial face 6c of the slot. This implies that one of the side walls of a bar 6 (the downstream wall) should be approximately perpendicular to the tangential component of the liquid motion, i.e. perpendicular to the anterior and posterior faces of this bar.

Looking at FIG. 7, some of the bars 6a are thicker than the other ones so as to form obstacles distributed at intervals corresponding for instance to 4 to 10 slots, these obstacles serving to slow down liquid flow over the length of the sieve, thus improving the effectiveness of the sieve and the cleaning action of the vanes 5a.

FIG. 8 shows a modified embodiment with dissymmetrical bars, each one of which is provided with a downstream spur 6b which causes swirls when the vanes 5a pass over them, thus improving the effectiveness of the slots.

FIGS. 9 and 10 show an embodiment in which the sieve is planar and the assemblies of bars according to this invention occupy only a portion of the surface of the sieve 14 where they form sieving areas 15, made in accordance with the invention and mounted within the overall area of the sieve.

The full area of the sieve may also be occupied for instance by sieving surfaces 15 having the shape of circular sectors with limited summital angles (preferably, less than 40°) placed side-by-side.

FIG. 10 is a perspective view of such a planar sieve over which runs a rotor 5 with vanes 5a. Preferably, the sieving surfaces are arranged so that either the bars or the cross-members will have an average radial direction (i.e. perpendicular to the tangential component of the liquid velocity).

Figure 14:
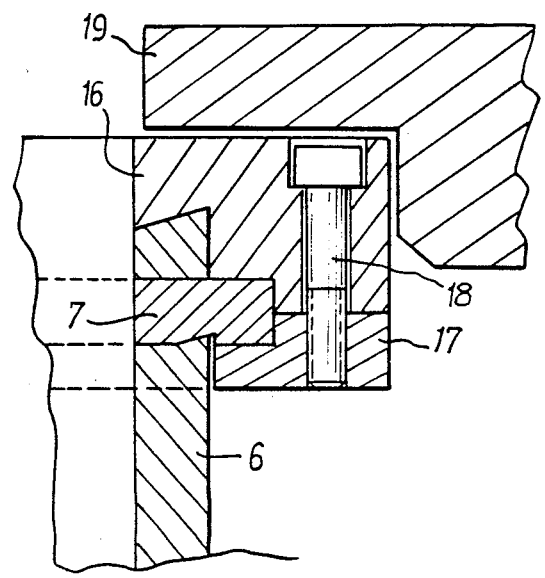
FIG. 14 shows one detail of the mounting of the sieve in the scrubber.

The mounting of a cylindrical sieve according to the invention within a scrubber may be effected in various manners, and more particularly by means of clamping flanges 16, 17 capping respectively the top and bottom ends of the bars 6 and clamping one cross-member 7 when pressed together by bolts 18 or other equivalent means. The sieve is mounted inside the scrubber by means of a carrier piece 19, FIG. 14.

Figure 15:
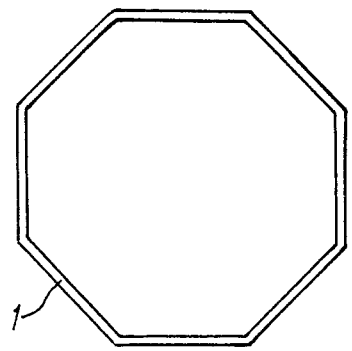
FIG. 15 is an example of a sieve with a polygonal cross-section.

Sieves according to the invention will generally by cylindrical, with a circular cross-section (FIG. 1, 2), or else planar (FIG. 9, 10). However, the invention is not restricted to these preferred embodiments. Thus, FIG. 15 shows a cylindrical sieve having a polygonal cross-section, and it is also possible to use a conical shape or a surface of revolution in which will be inserted sieving areas in a manner similar to the arrangement shown in FIG. 9, or again by placing sectors side-by-side.

The invention also encompasses scrubbers or other filtration or purifying devices, more particularly for the production of paper pulp, comprising a filter made in accordance with the foregoing description.

In the examples described and illustrated hereinabove, the bars have been represented as being parallel to the generating lines of a cylinder, the cross-members having the shape of a perpendicular cross-section.

However, the sieve may obviously be designed conversely with the cross-members parallel to the generating lines of the cylinder and the bars oriented along a perpendicular cross-section of the sieve.

Conversely, the slots may also be formed between adjacent edges of cross-members being assembled by the bars.

It will thus be apparent that the slots may just as well be parallel to the axis of the sieve, in which case they are perpendicular to the direction of the liquid flow, or else perpendicular to this axis and parallel to the liquid flow velocity component being tangent to the sieve.

What I claim is:

1. A sieve for scrubbers, comprising
   a plurality of support members each having a lateral groove and end portions,
   a plurality of solid elongated bars each having portions which mechanically interfit via a first set of notches with said lateral grooves of the support members to form a sieve, each support member further having a second set of notches spaced along a periphery thereof and engaging with said bars, said notches of the first set having a dovetail configuration with a base being wider than an opening and at least one side positioned at an acute angle to the base,
   said support members being spaced along the length of the bars, said bars defining spaces therebetween and said first and second notches positioning the bars and support members.

2. A sieve according to claim 1 wherein the first set of notches are dissymmetrical and have one face perpendicular to the axis of the bar and another face being inclined by an angle in the range from about 20 to 25°.

3. A sieve according to claim 2, wherein the end portions of the support members present, over a length corresponding to several notches of the second set, a thickness (measured along a parallel to the bars) of approximately half the thickness of a central portion of the support members so as to reconstitute the full cross-section of the support members by superimposing said end portions which are thereafter assembled by tightening together the flanks of the notches of the first set formed in the bars overlying said end portions.

4. A sieve according to claim 2, wherein there are provided from place to place thick second bars parallel to said elongated bars, wherein said second bars are thicker along the radial axis than the elongated bars and said thick second bars form protruding obstacles over the narrow face of the spaces formed between the elongated bars and the second bars.

5. A sieve according to claim 2 wherein the sieve is cylindrical, with a circular or regular polygonal cross-section, the bars being parallel to the axis of the cylindrical sieve and support members being perpendicular to said axis.

6. A sieve according to claim 1, wherein the end portions of the support members present, over a length corresponding to several notches of the second set, a thickness of approximately half the thickness of a central portion of the support members so as to reconstitute the full cross-section of the support members by superimposing said end portions which are thereafter assembled by tightening together the flanks of the notches of the first set formed in the bars overlying said end portions.

7. A sieve according to claim 1 wherein the bars and the support members are approximately of the same thickness and the notches of both sets have depths the sum of which is approximately equal to said thickness.

8. A sieve according to claim 1 wherein the bars have a generally trapezoid-shaped cross-section and the notches of the first set are located on the smaller side of the trapezoid.

9. A sieve according to claim 1 wherein there are provided from place to place thick second bars parallel to said elongated bars, wherein said second bars are thicker along the radial axis than the elongated bars and said thick bars form protruding obstacles over the narrow face of the spaces formed between the elongated bars and the second bars.

10. A sieve according to claim 1 wherein the bars have lateral faces forming upstream faces of the spaces, said bars having a spur protruding outward beyond the lateral faces.

11. A sieve according to claim 1 wherein at least some of the bars are dissymetrical and have one lateral face approximately perpendicular to anterior and posterior faces of said bars.

12. A sieve according to claim 1 wherein the sieve is cylindrical, with a circular or regular polygonal cross-section, the bars being parallel to the of the axis cylindrical sieve and the support members being perpendicular to said axis.

13. A sieve according to claim 1 wherein the sieve is cylindrical, with a circular or regular polygonal cross-section the bars being parallel to the axis of the cylindrical sieve and the support members being perpendicular to said axis.

14. A sieve according to claim 1 wherein the sieve is planar and comprises a plurality of elementary sieving surfaces each surface being arranged so that either the bars or the support members are approximately oriented radially towards the center of the sieve.

15. A method of manufacturing a sieve for scrubbers, said sieve having a plurality of support members with a lateral groove and a plurality of elongated bars, each said elongated bar having a first set of dovetail notches with a base being wider than an opening and at least one side positioned at an acute angle $\alpha$ to the base, each said groove being adapted for close engagement with said first set of dovetail notches, said method comprising of the following steps:
(a) folding each said bar at a level of said dovetail notches by an angle at least equal to $\alpha$;
(b) placing said bars over said plurality of support members so that said grooves are received by said dovetail notches;
(c) straightening said bars so as to clamp the support members;
(d) closing a cylinder by superimposing together end portions of the support members, said end portions having a thickness substantially equal to the half thickness of a central portion of the support members; and
(e) bringing said bars into place and clamping the support members within the dovetail notches of said bars.

* * * * *